US012125444B2

(12) United States Patent
Zhou et al.

(10) Patent No.: US 12,125,444 B2
(45) Date of Patent: Oct. 22, 2024

(54) PIXEL DRIVE CIRCUIT, DISPLAY PANEL, AND DISPLAY DEVICE

(71) Applicant: HKC CORPORATION LIMITED, Shenzhen (CN)

(72) Inventors: Xiufeng Zhou, Shenzhen (CN); Xin Yuan, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 62 days.

(21) Appl. No.: 18/145,981

(22) Filed: Dec. 23, 2022

(65) Prior Publication Data

US 2023/0419912 A1 Dec. 28, 2023

(30) Foreign Application Priority Data

Jun. 24, 2022 (CN) ........................ 202210722140.4

(51) Int. Cl.
*G09G 3/3275* (2016.01)

(52) U.S. Cl.
CPC ... *G09G 3/3275* (2013.01); *G09G 2300/0819* (2013.01); *G09G 2300/0842* (2013.01); *G09G 2300/0861* (2013.01); *G09G 2310/061* (2013.01); *G09G 2320/0233* (2013.01)

(58) Field of Classification Search
CPC .............................................. G09G 2310/0286
See application file for complete search history.

(56) References Cited

U.S. PATENT DOCUMENTS

2016/0189606 A1* 6/2016 Chen .................... G09G 3/3233 345/78
2023/0215375 A1* 7/2023 Lee ........................ G11C 19/28 345/204

FOREIGN PATENT DOCUMENTS

| | | | |
|---|---|---|---|
| CN | 110992880 | A | 4/2020 |
| CN | 114220382 | A | 3/2022 |
| CN | 114360434 | A | 4/2022 |
| WO | 2021185015 | A1 | 9/2021 |

* cited by examiner

*Primary Examiner* — Nan-Ying Yang
(74) *Attorney, Agent, or Firm* — Maier & Maier, PLLC

(57) ABSTRACT

A pixel drive circuit, in which a second voltage-stabilization circuitry is configured that assists in maintaining the potential of the control end of the drive transistor during a transition from a compensation-and-writing phase to the light-emitting phase and in a light-emitting phase. During the transition from the compensation phase to the light-emitting phase, due to a decrease of the voltage output from the first voltage-stabilization circuitry, the node voltage between the first and second voltage-stabilization circuitries will be pulled down first. By providing the second voltage-stabilization circuitry, an influence on the node voltage at the control end of the drive transistor caused due to the voltage variation at the nodes between the two circuitries will be greatly reduced, the leakage current of the two circuitries connected in series is smaller than the leakage current of the one single first voltage-stabilization circuitry in the light-emitting phase.

13 Claims, 4 Drawing Sheets

PIXEL DRIVE CIRCUIT, DISPLAY PANEL, AND DISPLAY DEVICE

CROSS-REFERENCE TO RELATED APPLICATION

Pursuant to 35 U.S.C. § 119 and the Paris Convention, this application claims the benefit of Chinese Patent Application No. 202210722140.4 filed on Jun. 24, 2022, the content of which is incorporated herein by reference.

FIELD

The present application relates to the field of display technology, and in particular, to a pixel drive circuit, a display panel and a display device.

BACKGROUND

The statements provided herein are merely background information related to the present application, and do not necessarily constitute any prior arts. With the development of the field of liquid crystal display, the advantages of the organic light-emitting display (OLED) display technology, such as self-luminous, thin and lightness, have gradually been widely used in TV, mobile phones, notebooks and other products. Because the OLED is a current-driven deice, when the threshold voltage Vth of the Thin Film Transistor (TFT) shifts, the current drive of OLED will not be stable and will change, resulting in uneven brightness. Currently, the current compensation is performed by a drive-compensation circuit. The drive-compensation circuit includes a TFT and a capacitor, the TFT is connected to a sub-pixel element. The control end of the TFT is connected to a data voltage, the input end of the TFT is connected to a drive voltage, and the capacitor is connected between the output and control ends of the TFT, so that the voltage input into the sub-pixel element can be regulated through a control of the data voltage. An operation process of the pixel drive circuit includes four phases, i.e., a reset phase, a compensation phase, a writing phase and a light-emitting phase. The control and input ends of the TFT are coupled to the input and output ends of a switch element. The control end of the switch element is coupled to a gate-control line. When the switch element is transited from the compensation phase to the light-emitting phase after the compensation phase, due to the channel capacitor of the switch element, the gate voltage of the switch element is dropped, and a step down of the node voltage at the control end of the drive transistor is caused simultaneously, as a result, the actual drive voltage will be inaccurate and the compensation effect deteriorates. On the other hand, in the light-emitting phase, a leakage current of the switch element will cause the node voltage at the control end of the drive transistor to decrease gradually, which is not conducive to maintaining light emission. The existing compensation method thus has some shortcomings.

SUMMARY

The present application provides a pixel drive circuit, a display panel and a display device, aiming at solving the problem of inaccurate actual drive voltage, poor compensation effect, and gradual decrease of node voltage at the control end of the drive transistor in the exemplary technology, which is not conducive to maintaining light emission.

In accordance with a first aspect of the present application, a pixel drive circuit is provided, which is applied to a display panel. The display panel includes a plurality of pixels, each pixel includes a plurality of sub-pixel elements. The pixel drive circuit includes: a drive circuitry, a data-writing circuitry, a first voltage-stabilization circuitry, and a second voltage-stabilization circuitry.

The drive circuitry includes a drive transistor and a storage capacitor, an input end of the drive transistor is coupled to a drive-voltage terminal, and an output end of the drive transistor is coupled to one sub-pixel element. One end of the storage capacitor is coupled to a control end of the drive transistor, and another end of the storage capacitor is coupled to the output end of the drive transistor. An output end of the data-writing circuitry is coupled to the output end of the drive circuitry. The data-writing circuitry is configured to write a data voltage to the control end of the drive transistor in a writing phase. The first voltage-stabilization circuitry is coupled between a set-voltage terminal and the control end of the drive transistor, and is configured, in response to a gate-control level output from a first gate-control-signal line, to maintain a potential at the control end of the drive transistor at a set voltage in a non-light-emitting phase. The second voltage-stabilization circuitry is coupled between the first voltage-stabilization circuitry and the control end of the drive transistor, and is connected in series with the first voltage-stabilization circuitry. The second voltage-stabilization circuitry is configured to assist in maintaining the potential at the control end of the drive transistor during a transition from a compensation-and-writing phase to a light-emitting phase, and in the light-emitting phase.

In an optional embodiment, the first voltage-stabilization circuitry includes a first voltage-stabilization transistor. A control end of the first voltage-stabilization transistor is coupled to the first gate-control-signal line, an input end of the first voltage-stabilization transistor is coupled to the set-voltage terminal, and an output end of the first voltage-stabilization transistor is coupled to the control end of the drive transistor.

In an optional embodiment, the second voltage-stabilization circuitry includes a second voltage-stabilization transistor. A control end of the second voltage-stabilization transistor is coupled to the drive-voltage terminal, an input end of the second voltage-stabilization transistor is coupled to the output end of the first voltage-stabilization transistor, and an output end of the second voltage-stabilization transistor is coupled to the control end of the drive transistor, to enable the output end of the first voltage-stabilization transistor to be coupled to the control end of the drive transistor.

In an optional embodiment, the set-voltage terminal is the drive-voltage terminal.

In an optional embodiment, the data-writing circuitry includes a data-writing control transistor. A control end of the data-writing control transistor is coupled to a second gate-control-signal line, an input end of the data-writing control transistor is coupled to the data-voltage terminal, and an output end of the data-writing control transistor is coupled to the output end of the drive transistor.

In an optional embodiment, the pixel drive circuit also includes a first input control transistor and/or a second input control transistor. A control end of the first input control transistor is coupled to a first emission-signal line, an input end of the first input control transistor is coupled to the output end of the drive transistor, and an output end of the first input control transistor is coupled to the sub-pixel element. A control end of the second input control transistor is coupled to a second emission-signal line, an input end of the second input control transistor is coupled to the drive-voltage terminal, and an output end of the second input control transistor is coupled to the input end of the drive transistor.

In an optional embodiment, the pixel drive circuit also includes: a reset circuitry, the reset circuitry, the other end of the storage capacitor and the output end of the drive transistor are coupled in common to the sub-pixel element. The reset circuitry is configured, in response to a reset signal output from a reset-level-signal line, to reset the potential at the output end of the drive transistor to a reference voltage in a reset phase.

In an optional embodiment, the reset circuitry includes a reset transistor. A control end of the reset transistor is coupled to the first gate-control-signal line, an input end of the reset transistor is coupled to a reference-voltage terminal, and an output end of the reset transistor is coupled to the other end of the storage capacitor In accordance with a second aspect of the present application, a method for driving pixels is provided, which includes steps of: transmitting the gate-control level output from the first gate-control-signal line to the first voltage-stabilization circuitry in the compensation-and-writing phase, to enable the potential at the control end of the drive transistor to be maintained at the set voltage; and switching off the first voltage-stabilization circuitry, to enable the second voltage-stabilization circuitry to assist in maintaining the potential at the control end of the drive transistor, during the transition from the compensation-and-writing phase to the light-emitting phase and in the light-emitting phase.

In accordance with a third aspect of the present application, a display panel is provided. The display panel includes a plurality of pixels and a plurality of pixel drive circuits as described above, each pixel includes a plurality of sub-pixel elements, and the plurality of pixel drive circuits are coupled to the plurality of sub-pixel elements in a one-to-one correspondence.

In accordance with a fourth aspect of the present application, a display device is provided, which includes a display panel and the above-mentioned pixel drive circuit. The display panel includes a plurality of pixels, and each pixel includes a plurality of sub-pixel elements.

It can be seen from the above solutions that, in the pixel drive circuit, the display panel and the display device provided by the embodiments of the present application, a second voltage-stabilization transistor is provided and configured to assist in maintaining the potential of the control end of the drive transistor during the transition from the compensation-and-writing phase to the light-emitting phase and in the light-emitting phase. Specifically, during a transition from the compensation phase to the light-emitting phase, due to a decrease of the voltage output from the first voltage-stabilization circuitry, the node voltage between the first and second voltage-stabilization circuitries will be pulled down first. Due to the newly-added second voltage-stabilization circuitry, influence on the node voltage of the control end of the drive transistor caused by voltage variation of the nodes between the two circuitries will be greatly reduced. Meanwhile, due to the existence of the second voltage-stabilization circuitry, the leakage current of the two circuitries connected in series is smaller than the leakage current of the one single first voltage-stabilization circuitry in the light-emitting phase, which is more conducive to assisting in maintaining the node voltage at the control end of the drive transistor.

BRIEF DESCRIPTION OF THE DRAWINGS

In order to illustrate the embodiments of the present application more clearly, the following will briefly introduce the drawings that need to be used for describing the embodiments or exemplary technologies. Obviously, the drawings in the following description are merely some embodiments of the present application, and for those of ordinarily skills in the art, other drawings can also be obtained according to these drawings without any creative effort.

DETAILED DESCRIPTION OF THE EMBODIMENTS

In order to make the objectives, solutions and beneficial effects of the present application more comprehensible, the present application will be further described in detail below with reference to the drawings and embodiments. It should be understood that the specific embodiments described herein are only used to explain the present application, but not to limit the present application.

In addition, the terms "first" and "second" are only used for descriptive purposes, and should not be construed as indicating or implying relative importance or implying the number of the feature indicated. Thus, a feature defined as "first" or "second" may expressly or implicitly include one or more of that feature. In the description of the present application, the phrase "a/the plurality of" means two or more, unless otherwise expressly and specifically defined. It should be noted that the pixel drive circuit, display panel and display device disclosed in the present application may be used in the field of display technology, and may also be used in any field other than the field of display technology. The application field of the pixel drive circuit, display panel and display device disclosed in the present application will not be limited here.

Figure 1:
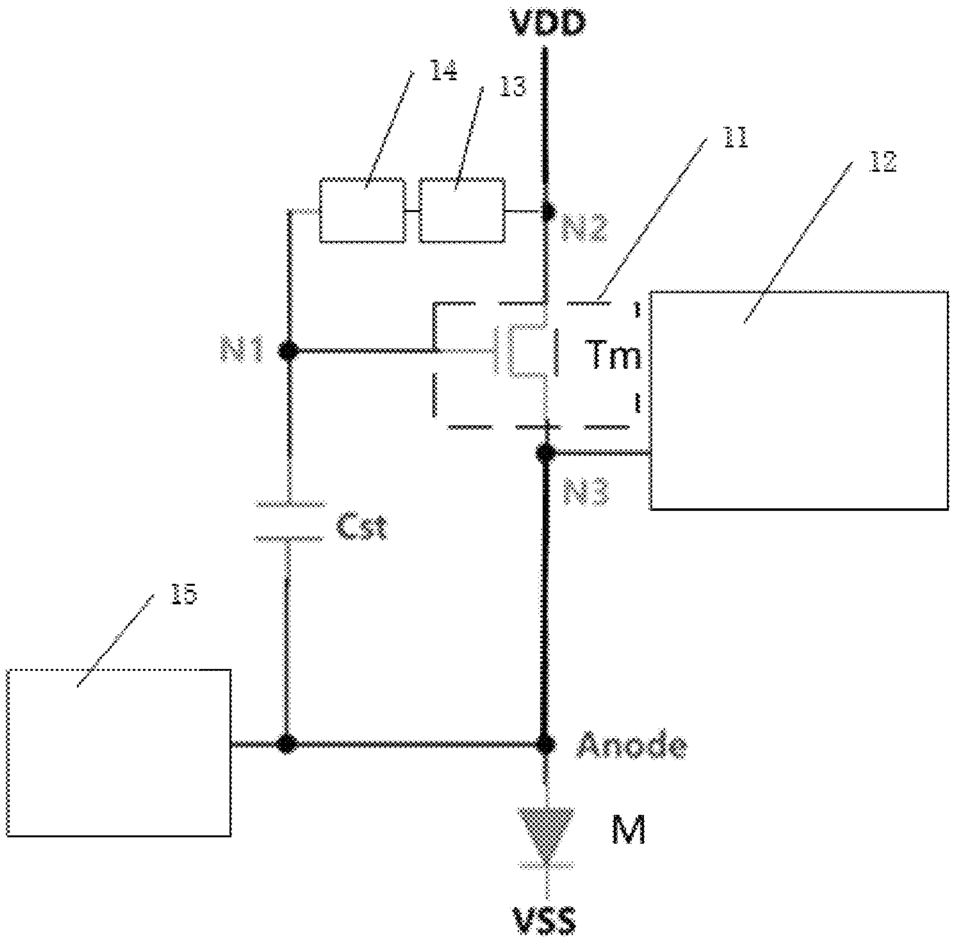
FIG. 1 is a schematic diagram of a circuitry structure of a pixel drive circuit in accordance with an embodiment of the present application.

FIG. 1 is a schematic structural diagram of a pixel drive circuit provided by an embodiment of the present application. As shown in FIG. 1, the pixel drive circuit specifically includes: a drive circuitry 11, a data-writing circuitry 12, a first voltage-stabilization circuitry 13, and a second voltage-stabilization circuitry 14. The drive circuitry 11 includes a drive transistor Tm and a storage capacitor Cst. An input end of the drive transistor Tm is coupled to a drive-voltage terminal, an output tend of the drive transistor Tm is coupled to a sub-pixel element. One end of the storage capacitor is coupled to a control end of the drive transistor Tm, and another end of the storage capacitor is coupled to the output end of the drive transistor Tm. An output end of the data-writing circuitry 12 is coupled to the output end of the drive circuitry 11, to write a data voltage to the control end of the drive transistor Tm in a writing phase. The first voltage-stabilization circuitry 13 is coupled between a set-voltage terminal and the control end of the drive transistor Tm. The first voltage-stabilization circuitry 13 is configured, in response to a gate-control level output from a first gate-control-signal line, to maintain a potential at the control end of the drive transistor Tm at a set voltage in a non-light-emitting phase. The second voltage-stabilization circuitry 14 is coupled between the first voltage-stabilization circuitry and the control end of the drive transistor Tm, and is in series with the first voltage-stabilization circuitry. The second voltage-stabilization circuitry 14 is configured to assist in maintaining the potential at the control end of the drive transistor Tm during a transition from a compensation-and-writing phase to a light-emitting phase, and in the light-emitting phase.

In the present application, a second voltage-stabilization circuitry is configured, and the second voltage-stabilization circuitry assists in maintaining the potential of the control end of the drive transistor during the transition from the compensation-and-writing phase to the light-emitting phase and in the light-emitting phase. Specifically, during a transition from a compensation phase to the light-emitting phase, due to a decrease of the voltage output from the first voltage-stabilization circuitry, the node voltage between the first voltage-stabilization circuitry and the second voltage-stabilization circuitry will be pulled down first. Due to the newly-added second voltage-stabilization circuitry, influence on the node voltage of the control end of the drive transistor caused by voltage variation of the nodes between the first and second voltage-stabilization circuitries will be greatly reduced. Meanwhile, due to the existence of the second voltage-stabilization circuitry, the leakage current of the two circuitries connected in series is smaller than the leakage current of the one single first voltage-stabilization circuitry in the light-emitting phase, which is more conducive to assisting in maintaining the node voltage at the control end of the drive transistor.

The present application will be described in detail below with reference to FIG. 2.

In the embodiments of the present application, the above-mentioned pixel drive circuit is applied to a display panel, and the display panel includes a plurality of sub-pixel elements, and the sub-pixel elements may be red sub-pixel elements, blue sub-pixel elements or green sub-pixel elements. Generally, three sub-pixel elements constitute a pixel, which is the smallest integrated unit that constitutes a pixel arrangement structure. The pixel arrangement structure constitutes a display area of the display panel, that is, the pixel arrangement includes a plurality of pixels arranged in a specific arrangement. Each pixel includes a plurality of sub-pixel elements, such as red sub-pixel elements, blue sub-pixel elements and green sub-pixel elements, and each sub-pixel element is electrically connected to a driver IC (reset-signal line, integrated circuit) through an independent drive line, the sub-pixel elements in the sub-pixel elements are powered on by a driving of the driver IC to emit color light.

It should be noted that, in the present application, the sub-pixel elements in one pixel may include a red sub-pixel element, a blue sub-pixel element and a green sub-pixel element, and the number of sub-pixel elements may be three or four, etc., which will not be limited here.

In a case that the number of sub-pixel elements in one pixel is three, generally, the three sub-pixel elements are respectively a red sub-pixel element, a blue sub-pixel element and a green sub-pixel element. In a case that the number of sub-pixel elements is four, the colors of the sub-pixel elements may respectively be: red, blue, green, and one other color, the other color may be different from red, blue, and green, such as white, yellow, or cyan. It should be noted that if the other color is white, the display brightness of the display device where the pixel arrangement structure is located can be improved. If the other color is other colors instead of white, the color gamut of the display device can be increased, which will not be limited here.

Further, it should be understood that the switch element of the present application may be a thin film transistor (TFT). In some embodiments, part of the pixel drive circuit can be placed in a non-display area of the display panel. In some embodiments, the switch element may also be other types of transistors, which will not be limited here.

Figure 2:
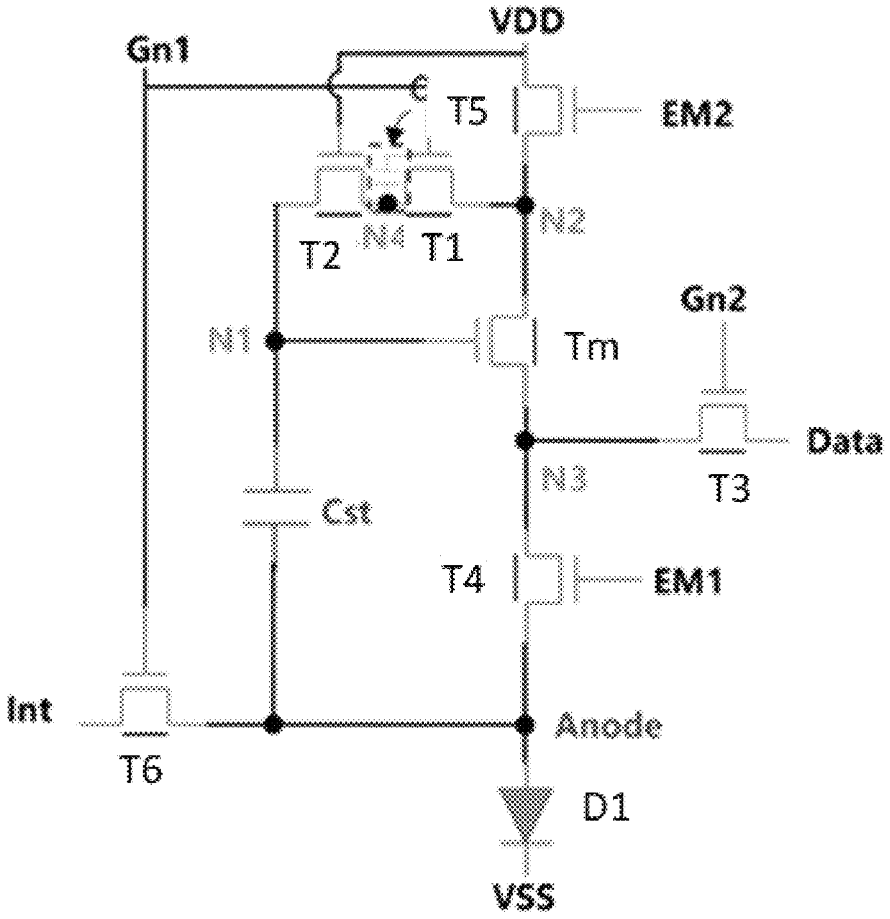
FIG. 2 is a schematic diagram of a specific structure of the pixel drive circuit in the embodiment of the present application.

In an embodiment of the present application, as shown in FIG. 2, the first voltage-stabilization circuitry includes a first voltage-stabilization transistor T1. An control end of the first voltage-stabilization transistor T1 is coupled to the first gate-control-signal line Gn1, an input end of the first voltage-stabilization transistor T1 is coupled to the set-voltage terminal, and an output end is coupled to the control end of the drive transistor Tm. In specific use, the first voltage-stabilization transistor T1 is switched on in the non-light-emitting phase. Since the second voltage-stabilization circuitry continues to be conductive in the non-light-emitting phase, the voltage at the control end of the drive transistor can be maintained. In the light-emitting phase, the first voltage-stabilization circuitry does not conduct, so that the voltage at the control end of the drive transistor is gradually reduced.

Further, also referring to FIG. 2, the second voltage-stabilization circuitry includes a second voltage-stabilization transistor T2, A control end of the second voltage-stabilization transistor T2 is coupled to a drive-voltage terminal VDD, an input end of the second voltage-stabilization transistor T2 is coupled to the output end of the first voltage-stabilization transistor T1, and an output end of the second voltage-stabilization transistor T2 is coupled to the control end of the drive transistor Tm, thereby enabling the output end of the first voltage-stabilization transistor T1 is coupled to the control end of the drive transistor Tm. In specific use, a potential of the second voltage-stabilization transistor T2 continues to rise up as the second voltage-stabilization transistor is coupled to a high level, thereby assisting in maintaining the potential at the control end of the drive transistor during the transition from the compensation-and-writing phase to the light-emitting phase and in the light-emitting phase. Due to the newly-added second voltage-stabilization circuitry, influence on the node voltage of the control end of the drive transistor caused by voltage variation of the nodes between the first and second voltage-stabilization circuitries will be greatly reduced. Meanwhile, due to the existence of the second voltage-stabilization circuitry, the leakage current of the two circuitries connected in series is smaller than the leakage current of the one single first voltage-stabilization circuitry in the light-emitting phase, which is more conducive to assisting in maintaining the node voltage at the control end of the drive transistor.

It can be understood that a transistor in the present application generally includes a control end, an input end and an output end. Correspondingly, the control end is the gate of the transistor, the input end and the output end are the source and drain of the transistor. The input end is a signal input end, the output end is a signal output end, and the control end is an end that controls whether the input signal passes through. For example, in FIG. 2, the input end of the drive transistor should be the end coupled to the drive-voltage terminal, and a drive voltage is derived from the input end to the output end, that is, the output end of the drive transistor is coupled to the sub-pixel element In a preferred embodiment, to reduce the number of signal lines, as shown in FIG. 2, the set-voltage terminal may be arranged as the drive-voltage terminal, that is, the control end of the second voltage-stabilization transistor is coupled to the drive-voltage terminal VDD, which on the one hand, enables the number of signal lines to be reduced, and on the other hand, enables the voltage at the N1 node (i.e., the control end of a corresponding the drive transistor) to be maintained. In a preferred embodiment, also referring to FIG. 2, the data-writing circuitry includes a data-writing control transistor T3, a control end of the data-writing control transistor T3 is coupled to a second gate-control-signal line Gn2, and input and output ends of the data-writing control transistor T3 are respectively coupled to the data-voltage terminal DATA and the input end of the drive transistor Tm.

The data-writing control transistor T3 is configured to control the timing of writing the data voltage DATA to the control end of the drive transistor Tm, and then the data voltage DATA written to the control end of the drive transistor Tm may be controlled by the conduction of the data-writing control transistor T3 in the reset, compensation, writing and light-emitting phases.

Further, in an embodiment of the present application, the pixel drive circuit also includes a first input control transistor T4, a control end of the first input control transistor T4 is coupled to a first emission-signal line EM1, input and output ends of the first input control transistor T4 are respectively coupled to the sub-pixel element and the output end of the drive transistor Tm, thereby enabling the output end of the drive transistor Tm to be coupled to the sub-pixel element.

In addition, in an embodiment of the present application, the pixel drive circuit also includes a second input control transistor T5, a control end of the second input control transistor T5 is coupled to a second emission-signal line EM2, input and output ends of the second input control transistor T5 are respectively coupled to the drive-voltage terminal VDD and the input end of the drive transistor Tm, thereby enabling the input end of the drive transistor Tm to be coupled to the drive-voltage terminal VDD.

In the above embodiment, the timing of writing the drive voltage into the drive transistor Tm is controlled by the second input control transistor T5 and the first input control transistor T4, which enables the drive transistor Tm to be controlled differently at different phases.

Further, in an embodiment of the present application, the pixel drive circuit also includes a reset circuitry. The reset circuitry, the other end of the storage capacitor and the output end of the drive transistor are connected in common to be coupled to the sub-pixel element, to reset the potential at the output end of the drive transistor to a reference voltage in response to a reset signal output from a reset-level-signal line in a reset phase.

Exemplarily, the reset circuitry includes a reset transistor T6, a control end of the reset transistor T6 is coupled to the first gate-control-signal line Gn1, an input end of the reset transistor T6 is coupled to a reference-voltage terminal Vin, and an output end of the reset transistor T6 is coupled to a second end of the storage capacitor. The capacitor element of the present application is described in detail in conjunction with the reset transistor T6. The fixed potential is electrically connected to the anode node through the capacitor Cst, thereby enabling the Vgs potential of the drive transistor Tm to remain relatively constant in the light-emitting phase, and ensuring switch characteristics of the drive transistor.

The reset transistor T6 can supplement a fixed electric potential provided by the voltage-stabilization capacitor Cst when the fixed electric potential of the voltage-stabilization capacitor Cst is insufficient, thereby further ensuring the switch characteristics of the drive transistor Tm.

In the above embodiment, any of the transistors may be a three-terminal device or a four-terminal device, which will not be limited here.

Figure 4:
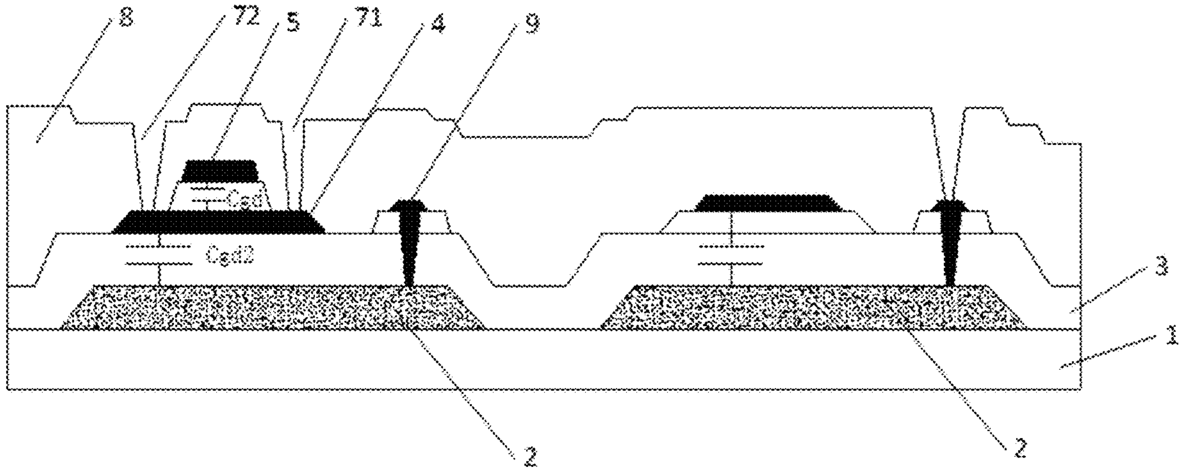
FIG. 4 is a schematic structural diagram of a four-terminal TFT.

Exemplarily, as shown in FIG. 4, in a case that the above-mentioned transistor in the present application is a four-terminal device, taking the drive transistor as an example, the drive transistor Tm in the present application includes: a substrate 1; a first metal layer 2 formed on one side surface of the substrate 1; an active layer 4 formed on a side of the first metal layer 2 away from the substrate 1; and a transistor structure arranged on a side of the active layer 4 away from the first metal layer 2. The transistor structure includes a gate constituted by a second metal layer 5, a source (formed by depositing metal from a via hole 72 in FIG. 1) and a drain (formed by depositing metal from a via hole 71 in FIG. 1) located on two sides of the second metal layer 5 and in electrical contact with the active layer 4. The first metal layer 2 is coupled to a direct-current (DC) voltage terminal.

In an embodiment of the present application, the first metal layer 2 is formed on the surface of one side of the substrate 1, and the first metal layer 2 constitutes a bottom gate of the thin film transistor. The bottom gate in the present application may be electrically connected to an external DC wire by depositing the conductive metal 9 through the via hole, for example, an end of the DC wire is soldered to the conductive metal in the via hole.

The active layer is formed on the side of the first metal layer 2 away from the substrate 1, that is, the active layer is located above the first metal layer 2, and during specific fabrication, a buffer layer 3 may be arranged between the active layer 4 and the first metal layer 2, which on the one hand, plays the role of electrical isolation, and on the other hand provides certain mechanical support and buffering.

The second metal layer 5 is formed above the active layer 4, the second metal layer 5 constitutes a top gate of the thin film transistor, and a gate insulation film (GI) layer 6 may be disposed between the second metal layer 5 and the active layer 4.

In addition, after an interlayer dielectric 8 is deposited on the active layer 4, and then the interlayer dielectric 8 is exposed and masked, a pair of via holes 71 and 72 may be formed on the active layer, and then metal is deposited on the via holes 71 and 72 to form the source and drain located on the two sides of the second metal layer 5 and in electrical contact with the active layer 4, whereby the transistor structure of the present application is formed, and specifically includes: The metal deposited in the pair of via holes serve as the source and drain, and the second metal layer serves as the gate.

In this embodiment, the first metal layer is arranged, and the first metal layer is coupled to the DC voltage terminal. Compared with the 3-terminal TFT in the exemplary technology, a capacitor Cgd2 is added, and an area of a plate of the capacitor Cgd2 can be configured in a relatively unrestricted environment, thus, on the one hand, the capacitor Cgd2 can be made larger, and on the other hand, the value of the capacitor of Cgd2 can be flexibly adjusted. In this way, the TFT is made into a 4-terminal device in the present application, a layer of metal disposed on a side of the bottom insulation layer opposite to a bottom surface of the device serves as a bottom gate of the device. The bottom gate is connected to a DC signal in the circuit. The capacitor Cgd2 will be formed between the bottom gate and the drain of the device, as an area of the bottom gate usually covers other electrodes of the entire device, the newly formed capacitor Cgd2 has a larger capacitance value. Because a potential variation at the control end of the drive TFT depends on the parasitic capacitor of the TFT and the storage capacitor of the control end of the drive TFT as well as the capacitance value of the newly formed capacitor Cgd2, so the capacitor Cgd2 may serve as a fixed voltage-stabilization capacitor, when a coupling effect of the capacitor occurs, to effectively offset the feedthrough effect of the capacitors Cgd, Cgs, and thus the effect of voltage-stabilization is further achieved, which ensures the effect of pixel display.

It should also be understood that, in the present application, the drive transistor Tm may be formed by TFTs of other structures, as long as the second control end is coupled to the DC voltage terminal.

The present application will be described in detail below with reference to the time-sequence diagram shown in FIG. 3.

First, in the reset phase, the potential of the first emission-signal line is pulled low, the first input control transistor T4 is switched off. The potential of the first gate-control-signal line is pulled high, so that the first voltage-stabilization transistor T1 and the reset transistor T6 are switched on. Meanwhile, the second voltage-stabilization transistor T2, due to the drive voltage input to the gate of the second voltage-stabilization transistor T2, is maintained at an on state, and the anode node and N1 node are reset to a reset-signal line Int.

Then, in the compensation phase and the writing phase, the compensation-and-writing phase: the potentials of the first emission-signal line and the second emission-signal line are both switched to a low level, so that the second input control transistor T5 and the first input control transistor T4 are both switched off. The potential of a first scan line is pulled low, so that the first voltage-stabilization transistor T1 and reset transistor T6 are switched off. The potential of a second scan line is pulled high, the data-writing control transistor T3 is switched on, and the data voltage is written to a node N3, as the drive voltage written to the node N1 in the previous phase enables the drive transistor Tm to be switched on, so the data voltage, passing through the data-writing control transistor T3, the drive transistor Tm, the first regulating transistor T1, and the second regulating transistor T2, is written back to the node N1, until the drive transistor Tm is switched off.

Finally, in the light-emitting phase, the potentials of the first scan line and the second scan line are both switched to a low level, the data-writing control transistor T3, the first voltage-stabilization transistor T1, the reset transistor T6, and the second voltage-stabilization transistor T2 are switched off. The potential at the node N1 is maintained to keep the drive transistor Tm in the on state. The potentials of the first emission-signal line and the second emission-signal line are both pulled high, enabling the second input control transistor T5 and the first input control transistor T4 to be switched on. The drive voltage, passing through the second input control transistor T5, the drive transistor Tm, the device current of the first input control transistor T4, is input to the anode of the OLED device, thereby providing holes for the sub-pixel element of the OLED device, and emitting light in combination with the electrons transmitted from the cathode.

Further, in the embodiments of the present application, under high temperature, due to the increase of the leakage current of the panel, the current of the panel may be recharged to the drive-voltage terminal VDD, thereby affecting the current stability provided by the drive-voltage terminal VDD. The diode element D1 of the present invention can prevent the large current at the panel side from flowing back to the drive-voltage terminal VDD.

It should be understood for those of ordinary skill in the art that the term "coupling/coupled to" in the present application can be a direct or indirect electrical connection. For example, if A and B are coupled, A may be directly electrically connected to B, or A may be electrically connected to B through C, which will not be limited here.

An embodiment of the present application provides a display panel. The display panel includes a plurality of pixels and a plurality of pixel drive circuits as described above, each pixel includes a plurality of sub-pixel elements, and the plurality of pixel drive circuits are coupled to the plurality of sub-pixel elements in a one-to-one correspondence.

In the display panel provided by the present application, the pixel drive circuit is included, the pixel drive circuit is provided with a second voltage-stabilization circuitry, and the second voltage-stabilization circuitry assists in maintaining the potential at the control end of the drive transistor during the transition from the compensation-and-writing phase to the light-emitting phase and in the light-emitting phase. Specifically, during the transition from the compensation phase to the light-emitting phase, due to a decrease of the voltage output from the first voltage-stabilization circuitry, the node voltage between the first and second voltage-stabilization circuitries will be pulled down first. Due to the newly-added second voltage-stabilization circuitry, influence on the node voltage of the control end of the drive transistor caused by voltage variation of the nodes between the two circuitries will be greatly reduced. Meanwhile, due to the existence of the second voltage-stabilization circuitry, the leakage current of the two circuitries connected in series is smaller than the leakage current of the one single first voltage-stabilization circuitry in the light-emitting phase, which is more conducive to assisting in maintaining the node voltage at the control end of the drive transistor.

Figure 5:
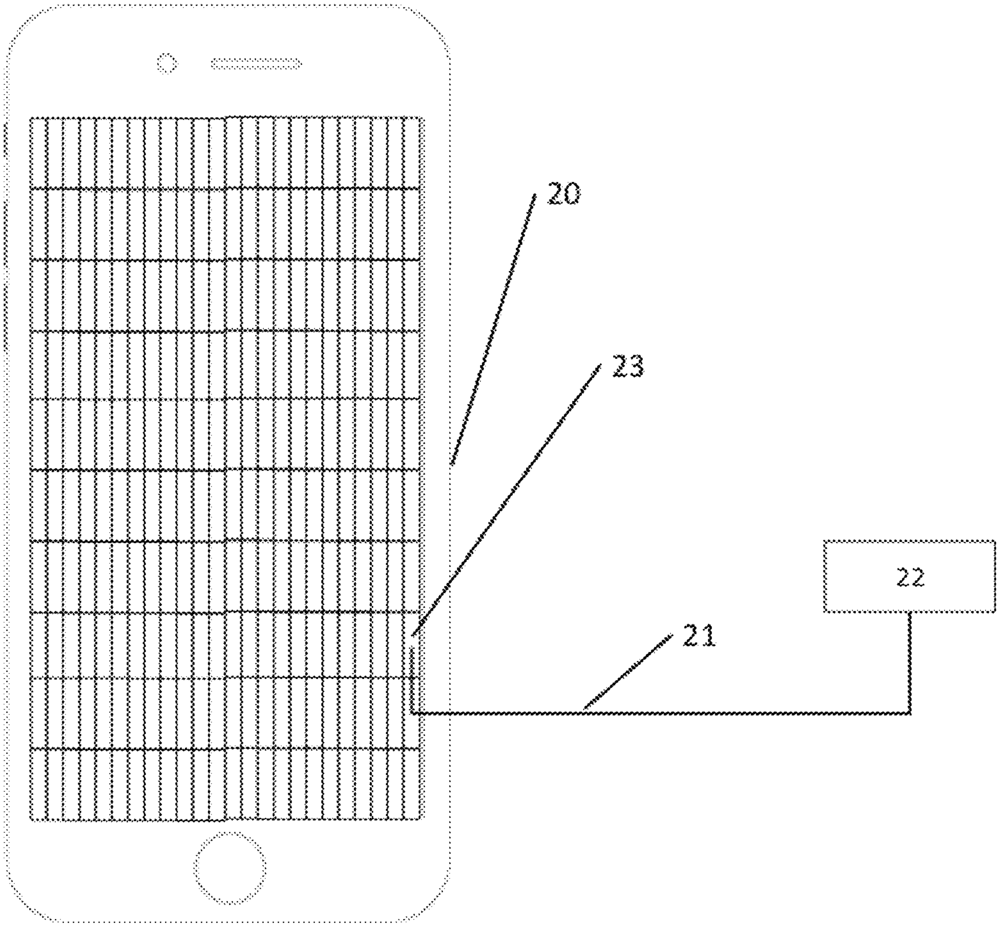
FIG. 5 is a schematic structural diagram of a display device in accordance with an embodiment of the present application.

As shown in FIG. 5, a display device 20 is provided in accordance with an embodiment of the present application, which includes a display panel and a pixel drive circuit 22 as above-described. The display panel includes a plurality of pixels, and each pixel includes a plurality of sub-pixel elements 23, each sub-pixel element is coupled to the pixel drive circuit of the present application through wires 21.

In a specific implementation, the display device provided by an embodiment of the present application may be any product or component having a display function, such as a mobile phone, a tablet computer, a television, a monitor, a notebook computer, a digital photo frame, and a navigator.

In an embodiment of the present application, it is also provided a driving method of a display device. The driving method is carried out using the pixel drive circuit as the above-mentioned, as shown in the time-sequence diagram of FIG. 3, the driving method includes steps of: transmitting the gate-control level output from the first gate-control-signal line to the first voltage-stabilization circuitry in the compensation-and-writing phase, thereby enabling the potential at the control end of the drive transistor to be maintained at the set voltage; and switching off the first voltage-stabilization circuitry, to enable the second voltage-stabilization circuitry to assist in maintaining the potential at the control end of the drive transistor, during the transition from the compensation-and-writing phase to the light-emitting phase and in the light-emitting phase.

Figure 3:
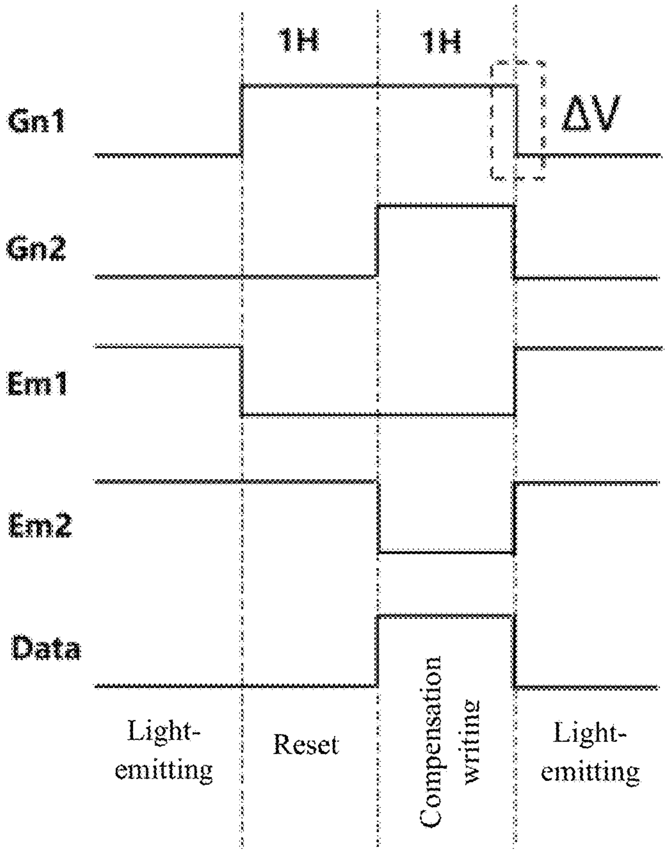
FIG. 3 is a schematic sequential control diagram of each signal line in FIG. 1.

As shown in FIGS. 2 and 3, firstly in the reset phase, the potential of the first emission-signal line is pulled low, the first input control transistor T4 is switched off. The potential of the first gate-control-signal line is pulled high, so that the first voltage-stabilization transistor T1 and the reset transistor T6 are switched on. Meanwhile, the second voltage-stabilization transistor T2, due to the drive voltage input to the gate of the second voltage-stabilization transistor T2, is maintained at the on state, and the anode and N1 node are reset to a reset-signal line Int.

Then, in the compensation phase and the writing phase, the compensation-and-writing phase: the potentials of the first emission-signal line and the second emission-signal line are both switched to a low level, so that the second input control transistor T5 and the first input control transistor T4 are both switched off. The potential of the first scan line is pulled low, so that the first voltage-stabilization transistor T1 and reset transistor T6 are switched off. The potential of the second scan line is pulled high, the data-writing control transistor T3 is switched on, and the data voltage is written to the node N3, as the drive voltage written to the node N1 in the previous phase enables the drive transistor Tm to be switched on, so the data voltage, passing through the data-writing control transistor T3, the drive transistor Tm, the first regulating transistor T1, and the second regulating transistor T2, is written back to the node N1, until the drive transistor Tm is switched off.

Finally, in the light-emitting phase, the potentials of the first scan line and the second scan line are both switched to a low level, the data-writing control transistor T3, the first voltage-stabilization transistor T1, the reset transistor T6, and the second voltage-stabilization transistor T2 are switched off. The potential at the node N1 is maintained to keep the drive transistor Tm in the on state. The potentials of the first emission-signal line and the second emission-signal line are both pulled high, enabling the second input control transistor T5 and the first input control transistor T4 to be switched on. The drive voltage, passing through the second input control transistor T5, the drive transistor Tm, the device current of the first input control transistor T4, is input to the anode of the OLED device, thereby providing holes for the sub-pixel element of the OLED device, and emitting light in combination with the electrons transmitted from the cathode.

It can be seen from the above solutions that, in the driving method provided by the embodiments of the present application, a second voltage-stabilization transistor is configured, the control end of the second voltage-stabilization transistor is coupled to the drive-voltage terminal, the input and output ends of the second voltage-stabilization transistor are connected in series with the input and output ends of the first voltage-stabilization transistor, so that the control end of the second voltage-stabilization transistor is coupled to a fixed high potential. Specifically, during a transition from the compensation phase to the light-emitting phase, due to a decrease of the voltage output from the first voltage-stabilization circuitry, the node voltage between the first and second voltage-stabilization circuitries will be pulled down first. Due to the newly-added second voltage-stabilization circuitry, influence on the node voltage of the control end of the drive transistor caused by voltage variation of the nodes between the two circuitries will be greatly reduced. Meanwhile, due to the existence of the second voltage-stabilization circuitry, the leakage current of the two circuitries connected in series is smaller than the leakage current of the one single first voltage-stabilization circuitry in the light-emitting phase, which is more conducive to assisting in maintaining the node voltage at the control end of the drive transistor.

It should be noted that, the embodiments of the drive circuit, the embodiments of the display device, and the embodiments of the driving method and the debugging method provided by the present application may all refer to each other, which will not be limited to the embodiments of the present application. Steps of the method for manufacturing the display panel provided by the embodiments of the present application can be correspondingly increased or decreased according to actual situations. Variations of these methods, that can be easily conceived by those skilled artists who are familiar with the field disclosed in the present application, should all be covered within the protection scope of the present application, which will not be further described in the present application.

The above descriptions are merely optional embodiments of the present application, and are not intended to limit the present application. Any modifications, equivalent replacements, improvements, etc. made within the fundamental and principles of the present application shall be included within the protection scope of the present application.

What is claimed is:

1. A pixel drive circuit, applied to a display panel, the display panel comprising a plurality of pixels, each pixel comprising a plurality of sub-pixel elements, and the pixel drive circuit comprising:

a drive circuitry, comprising:

a drive transistor, an input end of the drive transistor is coupled to a drive-voltage terminal, and an output end of the drive transistor is coupled to one of the plurality of sub-pixel elements; and a storage capacitor, one end of the storage capacitor is coupled to a control end of the drive transistor, and the other end of the storage capacitor is coupled to the output end of the drive transistor;

a data-writing circuitry, an output end of the data-writing circuitry is coupled to the output end of the drive circuitry, wherein the data-writing circuitry is configured to write a data voltage to the control end of the drive transistor in a writing phase;

a first voltage-stabilization circuitry coupled between a set-voltage terminal and the control end of the drive transistor, wherein the first voltage-stabilization circuitry is configured, in response to a gate-control level output from a first gate-control-signal line, to maintain a potential at the control end of the drive transistor at a set voltage in a non-light-emitting phase; and a second voltage-stabilization circuitry coupled between the first voltage-stabilization circuitry and the control end of the drive transistor, and connected in series with the first voltage-stabilization circuitry, wherein the second voltage-stabilization circuitry is configured to assist in maintaining the potential at the control end of the drive transistor during a transition from a compensation-and-writing phase to a light-emitting phase, and in the light-emitting phase, wherein the first voltage-stabilization circuitry comprises:

a first voltage-stabilization transistor, wherein a control end of the first voltage-stabilization transistor is coupled to the first gate-control-signal line, an input end of the first voltage-stabilization transistor is coupled to the set-voltage terminal, and an output end of the first voltage-stabilization transistor is coupled to the control end of the drive transistor; and the second voltage-stabilization circuitry comprises:

a second voltage-stabilization transistor, wherein a control end of the second voltage-stabilization transistor is coupled to the drive-voltage terminal, an input end of the second voltage-stabilization transistor is coupled to the output end of the first voltage-stabilization transistor, and an output end of the second voltage-stabilization transistor is coupled to the control end of the drive transistor, so that the output end of the first voltage-stabilization transistor is enabled to be coupled to the control end of the drive transistor.

2. The pixel drive circuit according to claim 1, wherein the set-voltage terminal is the drive-voltage terminal.

3. The pixel drive circuit according to claim 1, wherein the data-writing circuitry comprises:

a data-writing control transistor, wherein a control end of the data-writing control transistor is coupled to a second gate-control-signal line, an input end of the data-writing control transistor is coupled to the data-voltage terminal, and an output end of the data-writing control transistor is coupled to the output end of the drive transistor.

4. The pixel drive circuit according to claim 1, wherein the pixel drive circuit further comprises:

a first input control transistor, wherein a control end of the first input control transistor is coupled to a first emission-signal line, an input end of the first input control transistor is coupled to the output end of the drive transistor, and an output end of the first input control transistor is coupled to the sub-pixel element; and/or a second input control transistor, wherein a control end of the second input control transistor is coupled to a second emission-signal line, an input end of the second input control transistor is coupled to the drive-voltage terminal, and an output end of the second input control transistor is coupled to the input end of the drive transistor.

5. The pixel drive circuit according to claim 1, wherein the pixel drive circuit further comprises:

a reset circuitry, wherein the reset circuitry, the other end of the storage capacitor and the output end of the drive transistor are coupled in common to the sub-pixel element, and wherein the reset circuitry is configured, in response to a reset signal output from a reset-level-signal line, to reset the potential at the output end of the drive transistor to a reference voltage in a reset phase.

6. The pixel drive circuit according to claim 5, wherein the reset circuitry comprises:

a reset transistor, wherein a control end of the reset transistor is coupled to the first gate-control-signal line, an input end of the reset transistor is coupled to a reference-voltage terminal, and an output end of the reset transistor is coupled to the other end of the storage capacitor.

7. A display panel, comprising:

a plurality of pixels, each pixel comprising a plurality of sub-pixel elements; and a plurality of pixel drive circuits, wherein the plurality of sub-pixel elements is coupled to the plurality of the pixel drive circuits in a one-to-one correspondence, and each pixel drive circuit comprising:

a drive circuitry, comprising:

a drive transistor, an input end of the drive transistor is coupled to a drive-voltage terminal, an output end of the drive transistor is coupled to one of the plurality of sub-pixel elements; and a storage capacitor, one end of the storage capacitor is coupled to a control end of the drive transistor, the other end of the storage capacitor is coupled to the output end of the drive transistor;

a data-writing circuitry, an output end of the data-writing circuitry is coupled to the output end of the drive circuitry, wherein the data-writing circuitry is configured to write a data voltage to the control end of the drive transistor in a writing phase;

a first voltage-stabilization circuitry, coupled between a set-voltage terminal and the control end of the drive transistor, wherein the first voltage-stabilization circuitry is configured, in response to a gate-control level output from a first gate-control-signal line, to maintain a potential at the control end of the drive transistor at a set voltage in a non-light-emitting phase; and a second voltage-stabilization circuitry, coupled between the first voltage-stabilization circuitry and the control end of the drive transistor, and connected in series with the first voltage-stabilization circuitry, wherein the second voltage-stabilization circuitry is configured to assist in maintaining the potential at the control end of the drive transistor during a transition from a compensation-and-writing phase to a light-emitting phase, and in the light-emitting phase, wherein the first voltage-stabilization circuitry comprises:

a first voltage-stabilization transistor, wherein a control end of the first voltage-stabilization transistor is coupled to the first gate-control-signal line, an input end of the first voltage-stabilization transistor is coupled to the set-voltage terminal, and an output end of the first voltage-stabilization transistor is coupled to the control end of the drive transistor; and the second voltage-stabilization circuitry comprises:

a second voltage-stabilization transistor, wherein a control end of the second voltage-stabilization transistor is coupled to the drive-voltage terminal, an input end of the second voltage-stabilization transistor is coupled to the output end of the first voltage-stabilization transistor, and an output end of the second voltage-stabilization transistor is coupled to the control end of the drive transistor, to enable the output end of the first voltage-stabilization transistor to be coupled to the control end of the drive transistor.

8. A display device, comprising:

a display panel, comprising:

a plurality of pixels, each pixel comprising a plurality of sub-pixel elements; and a plurality of pixel drive circuits, wherein the plurality of sub-pixel elements is coupled to the plurality of the pixel drive circuits in a one-to-one correspondence, and each pixel drive circuit comprising:

a drive circuitry, comprising:

a drive transistor, an input end of the drive transistor is coupled to a drive-voltage terminal, an output end of the drive transistor is coupled to one of the plurality of sub-pixel elements; and a storage capacitor, one end of the storage capacitor is coupled to a control end of the drive transistor, the other end of the storage capacitor is coupled to the output end of the drive transistor;

a data-writing circuitry, an output end of the data-writing circuitry is coupled to the output end of the drive circuitry, wherein the data-writing circuitry is configured to write a data voltage to the control end of the drive transistor in a writing phase;

a first voltage-stabilization circuitry, coupled between a set-voltage terminal and the control end of the drive transistor, wherein the first voltage-stabilization circuitry is configured, in response to a gate-control level output from a first gate-control-signal line, to maintain a potential at the control end of the drive transistor at a set voltage in a non-light-emitting phase; and a second voltage-stabilization circuitry, coupled between the first voltage-stabilization circuitry and the control end of the drive transistor, and connected in series with the first voltage-stabilization circuitry, wherein the second voltage-stabilization circuitry is configured to assist in maintaining the potential at the control end of the drive transistor during a transition from a compensation-and-writing phase to a light-emitting phase, and in the light-emitting phase, wherein the first voltage-stabilization circuitry comprises:

a first voltage-stabilization transistor, wherein a control end of the first voltage-stabilization transistor is coupled to the first gate-control-signal line, an input end of the first voltage-stabilization transistor is coupled to the set-voltage terminal, and an output end of the first voltage-stabilization transistor is coupled to the control end of the drive transistor; and the second voltage-stabilization circuitry comprises:

a second voltage-stabilization transistor, wherein a control end of the second voltage-stabilization transistor is coupled to the drive-voltage terminal, an input end of the second voltage-stabilization transistor is coupled to the output end of the first voltage-stabilization transistor, and an output end of the second voltage-stabilization transistor is coupled to the control end of the drive transistor, to enable the output end of the first voltage-stabilization transistor to be coupled to the control end of the drive transistor.

9. The display panel according to claim 7, wherein the set-voltage terminal is the drive-voltage terminal.

10. The display panel according to claim 7, wherein the data-writing circuitry comprises:

a data-writing control transistor, wherein a control end of the data-writing control transistor is coupled to a second gate-control-signal line, an input end of the data-writing control transistor is coupled to the data-voltage terminal, and an output end of the data-writing control transistor is coupled to the output end of the drive transistor.

11. The display panel according to claim 7, wherein each pixel drive circuit further comprises:

a first input control transistor, wherein a control end of the first input control transistor is coupled to a first emission-signal line, an input end of the first input control transistor is coupled to the output end of the drive transistor, and an output end of the first input control transistor is coupled to the sub-pixel element; and/or a second input control transistor, wherein a control end of the second input control transistor is coupled to a second emission-signal line, an input end of the second input control transistor is coupled to the drive-voltage terminal, and an output end of the second input control transistor is coupled to the input end of the drive transistor.

12. The display panel according to claim 7, wherein each pixel drive circuit further comprises:

a reset circuitry, wherein the reset circuitry, the other end of the storage capacitor and the output end of the drive transistor are coupled in common to the sub-pixel element, and wherein the reset circuitry is configured, in response to a reset signal output from a reset-level-signal line, to reset the potential at the output end of the drive transistor to a reference voltage in a reset phase.

13. The display panel according to claim 12, wherein the reset circuitry comprises:

a reset transistor, wherein a control end of the reset transistor is coupled to the first gate-control-signal line, an input end of the reset transistor is coupled to a reference-voltage terminal, and an output end of the reset transistor is coupled to the other end of the storage capacitor.

* * * * *